United States Patent [19]

Thorne

[11] Patent Number: 6,100,891
[45] Date of Patent: Aug. 8, 2000

[54] CALL CENTER AGENT INTERFACE AND DEVELOPMENT TOOL

[75] Inventor: Glenn A. Thorne, Bettendorf, Iowa

[73] Assignee: Teledirect International, Inc., Davenport, Iowa

[21] Appl. No.: 09/093,612

[22] Filed: Jun. 9, 1998

[51] Int. Cl.[7] ............................... G06F 3/00; H04M 3/60
[52] U.S. Cl. ...................... 345/357; 345/353; 345/356; 379/267
[58] Field of Search ...................... 345/356, 357, 345/334, 353, 352, 339, 333; 379/223, 93.23, 93.17, 265, 267

[56] References Cited

U.S. PATENT DOCUMENTS

| | | | |
|---|---|---|---|
| 5,455,903 | 10/1995 | Jolissaint et al. | 345/348 |
| 5,463,682 | 10/1995 | Fisher et al. | 379/201 |
| 5,621,789 | 4/1997 | McCalmont et al. | 379/265 |
| 5,754,636 | 5/1998 | Bayless et al. | 379/142 |
| 5,898,772 | 4/1999 | Connors et al. | 379/265 |
| 5,923,737 | 7/1999 | Weishut et al. | 379/93.17 |

OTHER PUBLICATIONS

TeleDirect International Inc., "Liberation (User Guide)".
TeleDirect Liberation 5.0 Professional Application Builder Training, "Liberation Training Materials".

*Primary Examiner*—Raymond J. Bayerl
*Assistant Examiner*—Cuong T. Thai
*Attorney, Agent, or Firm*—Millen, White, Zelano, Branigan, P.C.

[57] ABSTRACT

An agent interface for interactively providing a script to an agent during a calling campaign includes an outline panel means for displaying a call flow outline, the call flow outline having a series of hierarchical topics relating to the campaign. The call flow outline provides an indication of the current position among the hierarchical topics in the script, and provides a means for navigating through the topics. An action panel is associated with each topic and displays a set of objects relating to the topic. Selection of a new topic from the call flow outline, either manually or automatically in response to fulfillment of exit conditions associated with a previous topic, causes the call flow outline to indicate the new topic as the current topic and causes the action panel means to display a second set of objects associated with the new topic. An application development tool is further provided for facilitating design and testing of agent interface applications using a graphical, standardized programming environment.

19 Claims, 6 Drawing Sheets

Microfiche Appendix Included
(23 Microfiche, 2232 Pages)

FIG. 3

CALL CENTER AGENT INTERFACE AND DEVELOPMENT TOOL

This application includes a microfiche appendix which has a total of 23 microfiche and a total of 2232 frames.

BACKGROUND OF THE INVENTION

1. Field of the Invention

The invention relates in general to machines for call center automation, and in particular to an agent interface and development tool for inbound and outbound campaign management.

2. Related Art

FIG. 1 shows a block diagram illustrating the general operation of an inbound call center. A typical inbound system includes an Automatic Call Distributor (ACD), agent and supervisory workstations, data network, file server and database, and optionally a CTI Gateway.

The commercially available ACD provides a connection to the public telephone network, voice connections to ACD desk instruments at the agent workstations and an optional data link to a CTI gateway. The function of the ACD is to accept incoming calls from calling parties and route them to a queue. Available agents assigned to the queue answer waiting calls in a FIFO manner. The phone number dialed by the calling party determines the queue.

The data network, in conjunction with the file server, provides connectivity between all nodes in the system. The file server may host the database, or, the database may be hosted on a separate server. The file server also provides file and printer sharing services to other nodes on the network.

Agent workstations typically include an ACD desk set and a computer workstation. The ACD set provides a voice connection to the ACD. Modern ACD sets are digital and include LCD display capabilities. The computer workstation is a networked PC running client-server software that accesses information on the network file server and database. The agent workstation application software is used to conduct business with calling or called parties and is specific to the business. The application software used on the supervisory workstation is used to control the system, manage the database and produce reports.

The application software provides three important functions. It provides scripts that are tailored for a particular purpose, a means for accessing calling party account information as part of a script while servicing calls, and a means for tracking calls, account information, and productivity of projects and agents.

The optional CTI gateway to the ACD may be used by application software running on the supervisory workstation to provide ACD control and reporting functions in place of, or in addition to, a dedicated ACD terminal. The gateway may also be used to provide ANI, DNIS, and other ACD functionality to the agent workstation applications.

In typical operation, a supervisor assigns agents to campaigns and ACD queues, agents log on and take calls while using the application software and script to conduct the business at hand. Prior to active operation, scripts and databases are created, and associations made between ACD queues, scripts, and campaigns.

When an agent logs in to the system and awaits the first call, the agent application software communicates the agent's availability to the ACD via the CTI gateway. When the first call arrives and is connected to the agent, the CTI gateway provides the DNIS/ANI information to the agent application. The application selects and runs the script associated with the DNIS information and uses the ANI information information pertaining to the calling party.

Depending on the capabilities of the particular ACD in use, and the level of automation implemented, any of the steps in the proceeding paragraph may be performed manually using the ACD set.

With reference to FIG. 2, a typical call c enter outbound system includes a Campaign Server, Telephony Server, agent and supervisory workstations, data network, file server and database. The workstation software, Telephony Server and Campaign Server operate in a Client/Server environment utilizing network messages for inter-application communications.

The Campaign Server tracks agent logon sessions and manages the call records included in each campaign.

The Telephony Server provides a connection to the public telephone network, voice connections to telephone desk instruments at the Agent Workstations and a data network connection. The function of the Telephony Server is to place outgoing calls based on telephone numbers contained in call records supplied by the Campaign Server. Calls may be placed in predictive or preview mode. A pacing algorithm operating independently for each campaign regulates placement of predictive calls. Answered calls are routed to available agents, and unanswered calls such as ring no answer, busy, answering machine or operator intercept are automatically coded by the Telephony Server. Completed call records are returned to the Campaign Server for update. The Telephony Server also performs other telephony-related functions on behalf of the agent such as hook flash signaling and call transfers.

The Data Network, in conjunction with the file server, provides connectivity between all nodes in the system. The file server may host the database, or, the database may be hosted on a separate server. The file server also provides file and printer sharing services to other nodes on the network.

Agent workstations include a telephone desk set and a computer workstation. The desk set provides a voice connection to the Telephony Server. The computer workstation is a networked PC running client-server software that communicates with the Campaign Server and Telephony Server via network messages. The agent workstation application software is used to conduct business with calling or called parties and is specific to the business. The software used on the supervisory workstation is used to control the system, manage the database and produce reports.

The application software provides three important functions. It provides scripts that are tailored for a particular purpose, a means for accessing database information as part of a script while servicing calls, and a means for tracking calls, called party information, and productivity of projects and agents.

In typical operation, a supervisor assigns agents to campaigns, agents log on and take calls while using the application software and script to conduct the business at hand. Prior to active operation, scripts, databases and campaigns are created, and associations made between scripts and campaigns.

When an agent logs on to the system, the Campaign Server responds with a list of available campaigns. When the agent requests attachment to a campaign, the campaign server responds with a start message. When the agent becomes available to take calls, the agent application software notifies the Telephony Server. The Telephony Server obtains records from the Campaign Server and begins placing calls. Answered calls are connected to available agents with the call record passed to the agent as part of the connection notification message. The agent application runs the campaign script using the call record. When the agent has finished with the called party, the agent notifies the Telephony Server to release the call. When the agent has completed changes to the call record, the record is passed back to the Telephony Server and the agent is available for the next call. The Telephony Server returns the modified call record to the Campaign Server for database update.

Automating agent-based call center applications poses two main challenges; translating paper scripts, lists, forms and special instructions into the automated environment, and training the agents on both the business application and the computer programs.

Effective and profitable call center operations require fast response to business needs. Implementation and modification of business applications ordinarily involves computer programmers and is costly and time-consuming. Also, in many environments, agents are not dedicated to a single business application but handle calls for multiple projects during a shift. Inconsistencies in user interfaces increase agent training requirements and poses difficulties for quality control.

Scripting requirements for business applications vary widely and translate into applications from simple single screen data capture, to "loosely scripted" multi-screen applications, to "tightly scripted" scenarios. Most require some latitude in script flow for certain portions of the script and strict enforcement in other areas.

SUMMARY OF THE INVENTION

The invention according to a preferred embodiment provides an improved agent interface for interactively providing a script to an agent during a calling campaign. The agent interface includes an outline panel means for displaying a call flow outline, the call flow outline having a series of hierarchical topics relating to the campaign. The call flow outline provides an indication of the current position among the hierarchical topics in the script, and provides a means for navigating through the topics. An action panel means is associated with each topic and displays a set of objects relating to the topic. Selection of a new topic from the call flow outline, either manually or automatically in response to fulfillment of exit conditions associated with a previous topic, causes the call flow outline to indicate the new topic as the current topic and causes the action panel means to display a second set of objects associated with the new topic. A graphical application development tool is further provided for facilitating design and testing of agent interface applications using a graphical, standardized programming environment.

BRIEF DESCRIPTION OF THE DRAWINGS

The foregoing and other objects, features, and advantages of the invention will be apparent from the following more particular description of preferred embodiments as illustrated in the accompanying drawings, in which reference characters refer to the same parts throughout the various views. The drawings are not necessarily to scale, emphasis instead being placed upon illustrating principles of the invention.

FIG. 3 shows a graphical screen view illustrating an agent interface screen according to an embodiment of the invention.

DETAILED DESCRIPTION

Figure 1:
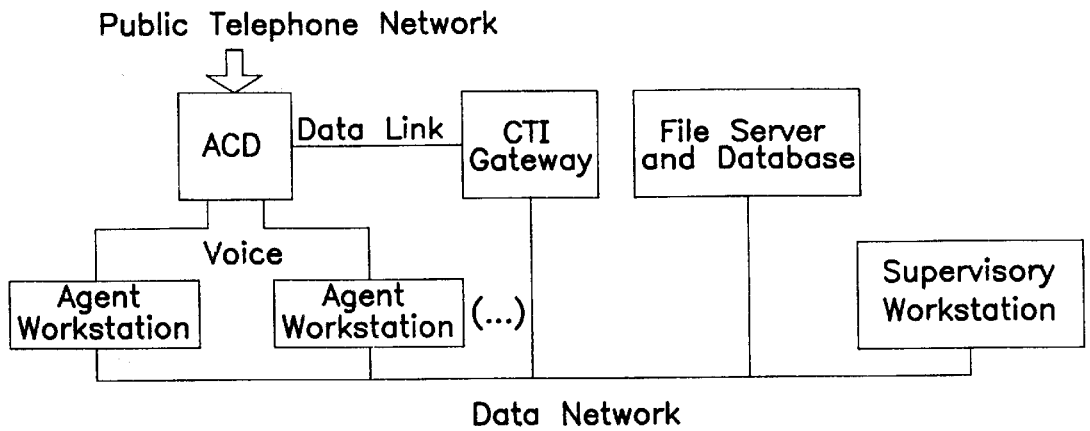
FIG. 1 shows a schematic block diagram illustrating outbound call center hardware.
Figure 2:
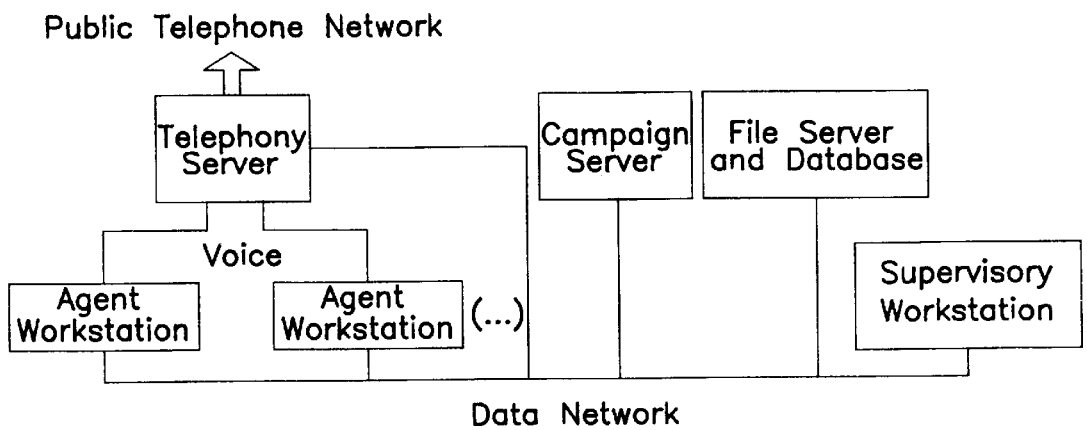
FIG. 2 shows a schematic block diagram illustrating inbound call center hardware.
Figure 3:
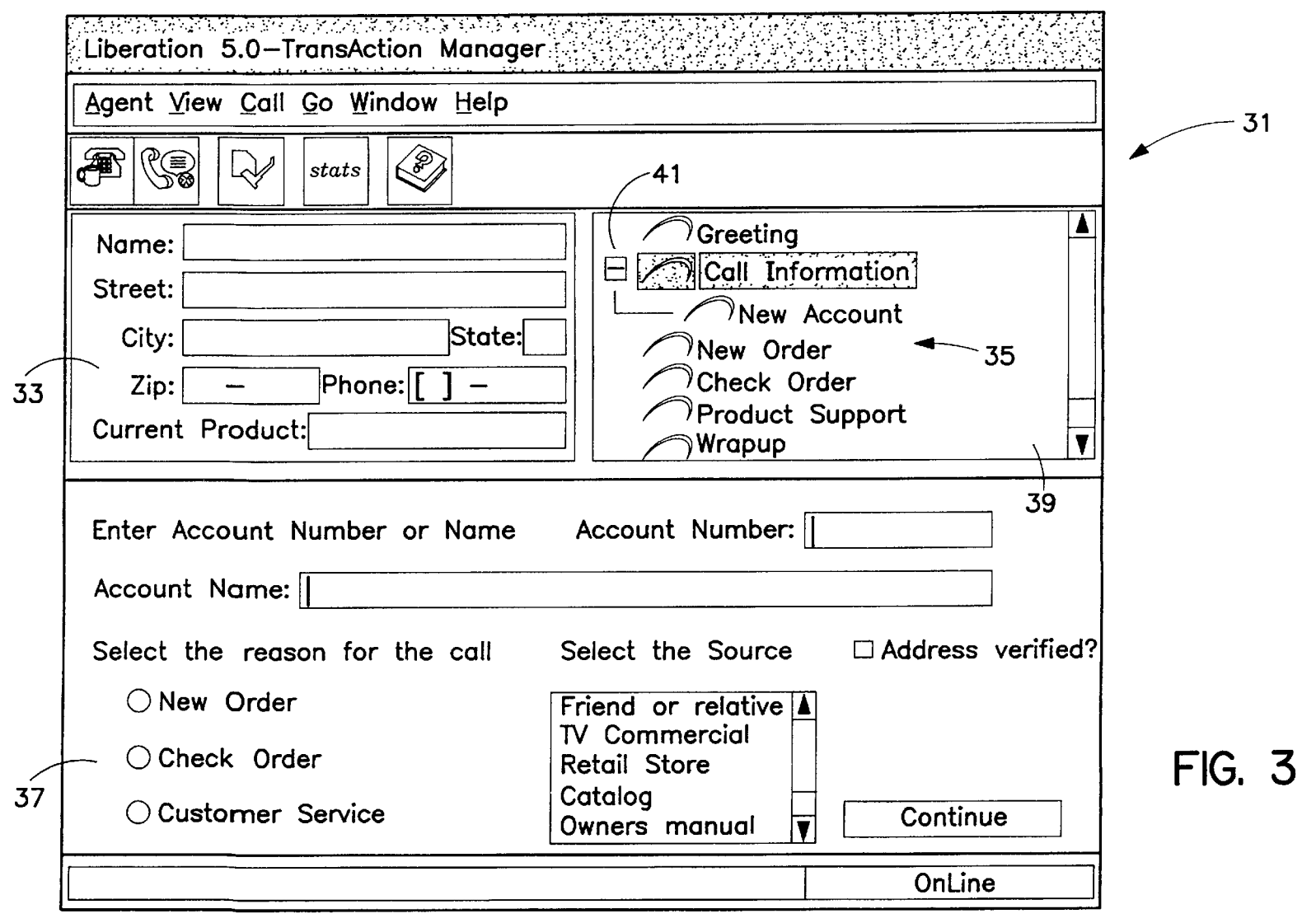

With reference to FIG. 3, the agent interface according to a preferred embodiment includes a transaction management screen 31 which comprises a data display panel 33 for displaying called/calling party information, a call flow outline panel 39 for graphically expressing the script, and an action panel 37 for displaying script elements. While an example of the content of these elements is shown in FIG. 3, such content is specific to the application and is specified using the development tool, which is discussed in detail below.

The agent prompts the called/calling party for information by following the script text and records responses by filling in entry fields, making selections from lists, and manipulating other interface controls. The script text, entry fields, selection lists, and other interface controls are contained in the action panel area 37 of the agent's screen. The contents of the action panel are specific to the current section of the script. The program directs the conversation according to a default script scenario and customer responses. The program may provide message dialogues for invalid or incomplete entries.

The entire script is expressed in the call flow outline panel 39 as a series of hierarchical topics 35. The call flow outline indicates the current position in the script, identifies available topics, and is used as a menu for actual navigation. Iconic distinction is preferably made between available and unavailable topics. The call flow outline may also identify completed and incomplete topics.

Each topic is associated with an action panel, discussed in detail below, which includes content that is pertinent to the topic. Initial user input focus is on the active item in the Action Panel for the first Call Flow Outline topic as defined in the client application. As an agent completes an Action Panel, the Action Panel corresponding to the next topic in the Call Flow Outline default script scenario is displayed and the call flow outline panel 39 is updated to show the next topic as the current topic. If the conversation between the agent and the called/calling party does not follow the default scenario, an agent may navigate by selecting a topic from the outline via the mouse or arrow keys, thereby overriding the default flow of the outline when allowed by the application. Topics may exist in the Call Flow Outline which are not in the default flow and are only activated manually by the agent and/or programmatically by the script logic.

The availability of each topic 35 is based on call data. This provides dynamic and logical script branching. In the absence of any call data constraints, the default script flow is preferably sequential through the outline.

The call flow outline is dynamic in that only topics pertinent to the current context are available. Unavailable topics may be iconically distinguished on the outline or may not be shown.

Expansion and contraction tools 41 are provided in the form of plus and minus signs which, when activated, operate to increase or decrease the level of outline detail which is displayed. By expanding and contracting the hierarchical outline, the display can be changed to show outline detail as necessary or can be kept simple. The default outline display preferably includes available and completed topics for all levels up from, and including, the current topic. The display can be overridden on a topic-by-topic basis based on call data and the current context.

Each call flow outline topic 35 is associated with a pertinent action panel screen 37 which contains the script text, prompts, entry fields, interface controls, data entry fields, selection lists, push buttons and other user input controls or information displays which are used to collect information from the agent and guide the agent through the call. An action panel may be associated with more than one call flow outline topic.

The action panel 37 is the point of focus for a topic in the call flow outline and leads the agent through the script by displaying text and receiving input pertinent to the topic from the agent. Each action panel has a set of exit conditions which are based on call data. The exit conditions are used to either automatically exit the panel to the next issue in the call flow outline upon completion of an issue, or, are used as validation to control a manual exit of the panel. Data entry elements that are required or have data validation routines include error message dialogues that are displayed when an attempt to exit the panel is made before the required data is entered.

Each script has a default scenario where the flow is from topic to topic. Logic attached to topic entry, topic exit or any interface control event may direct the script flow to an available topic not in the default flow. Logic evaluation may be based upon any call or script data.

The text displayed in the action panel 35 for a particular topic may be static, or may be dynamic information obtained from the call data or from a table lookup.

Various functions may be associated with key entries in the agent interface. For example, pressing F12 may change focus to the Call Flow. Pressing the enter key on a Call Flow Outline topic may be used to activate the appropriate Action Panel with input focus on the initial item. Pressing the Escape key while in the Call Flow Outlines may be used to cause the last active topic to be highlighted and focus is changed back to the Action Panel. The F1 key may be used to activate help for the agent interface program with a table of contents. Pressing Shift-F1 may be used to activate program help with the keyword index. The F2 key may be used to activate an application specific encyclopedia with a table of contents, and pressing Shift-F2 may activate the encyclopedia with the keyword index.

APPLICATION DEVELOPMENT TOOL

The system of the invention further provides an application building tool which provides a means for designing and testing the agent interface described above. FIGS. 4 through 7 show screens illustrating the interface of the application building tool of the invention. Further details are set forth in the "Liberation Training Materials" and "Liberation User Guide" references filed herewith, the entire disclosures of which are incorporated herein by reference.

Standard features, functions, and options for the agent interface program are available from within the application development tool. Both the application development tool and the agent interface programs are frameworks in that features, functions, and options can be added or extended by a programmer using, e.g., Smalltalk programming.

"Drag & Drop," popup menu and selection list type interfaces are preferably used throughout the development tool to enhance developer productivity.

Figure 4:
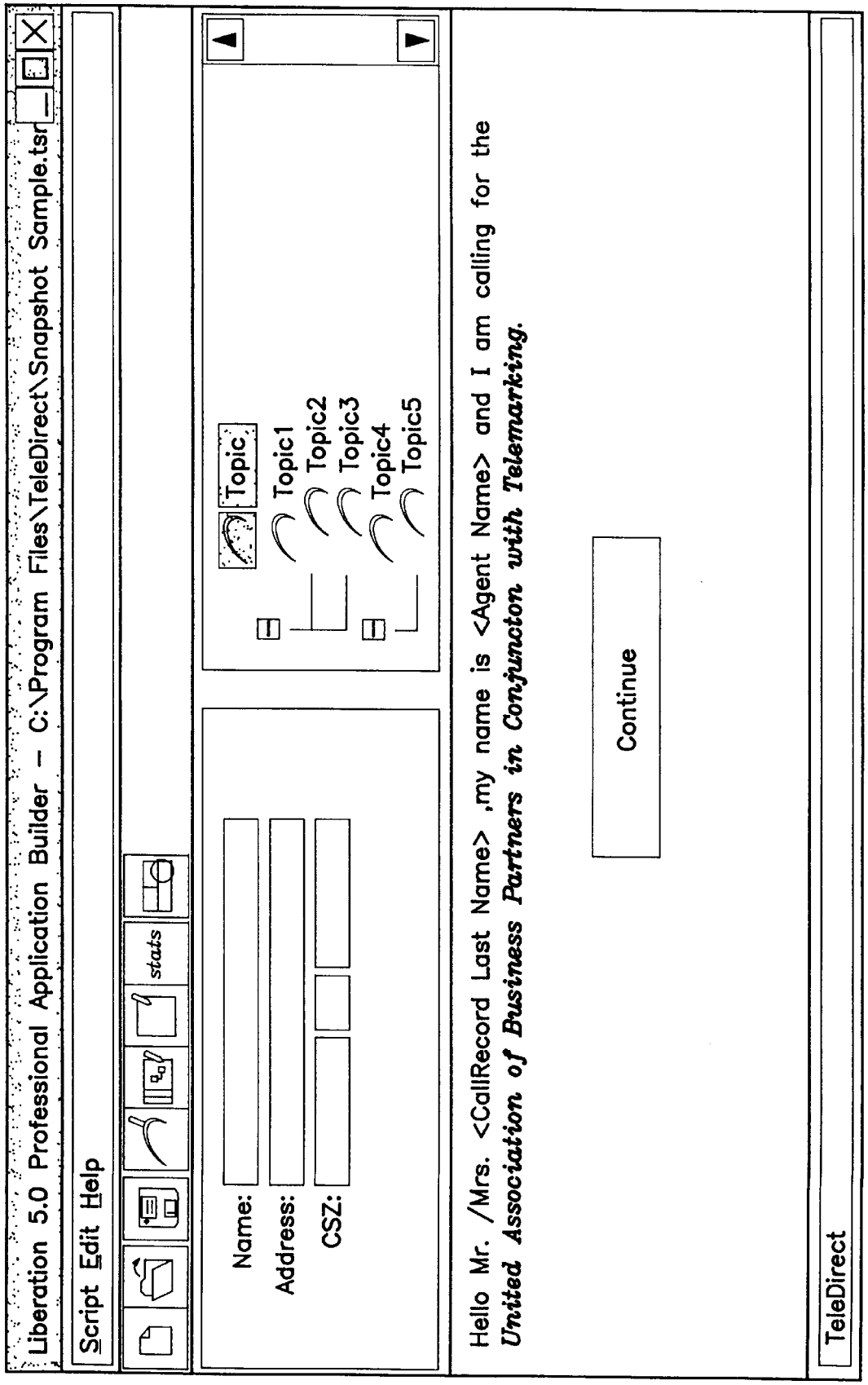
FIG. 4 shows a graphical screen view illustrating a main screen of the interface to an application development tool of the invention.

FIG. 4 illustrates a main screen of the Application Development Tool. Broadly, the Application Development Tool Application is used by an Application Developer to define call data elements, define call data display panels, implement the call flow outline, define action panels, and implement supplemental information. These functions are discussed in more detail below.

The application development tool provides for defining call data elements, their display attributes and data manipulation methods. The application developer defines the call data elements by creating a new element and assigning a logical name. New elements are local program variables and may also be mapped to the database for read only lookup, or update. The developer may assign a list of allowable values to each element by entering the list of values or establishing a database table mapping. Data elements that are ID coded may be mapped to a lookup table to create a second data element containing de-coded information. Data validation and manipulation methods are established from a list of standard methods or by building a new methods using a graphical "method builder" interface.

Methods for standard data type conversion and validation (i.e., character, numeric, currency, zip/postal code, etc.) are available and may be called from another method or an action panel. Additional methods for data conversion, validation and manipulation may also be defined.

Figure 5:
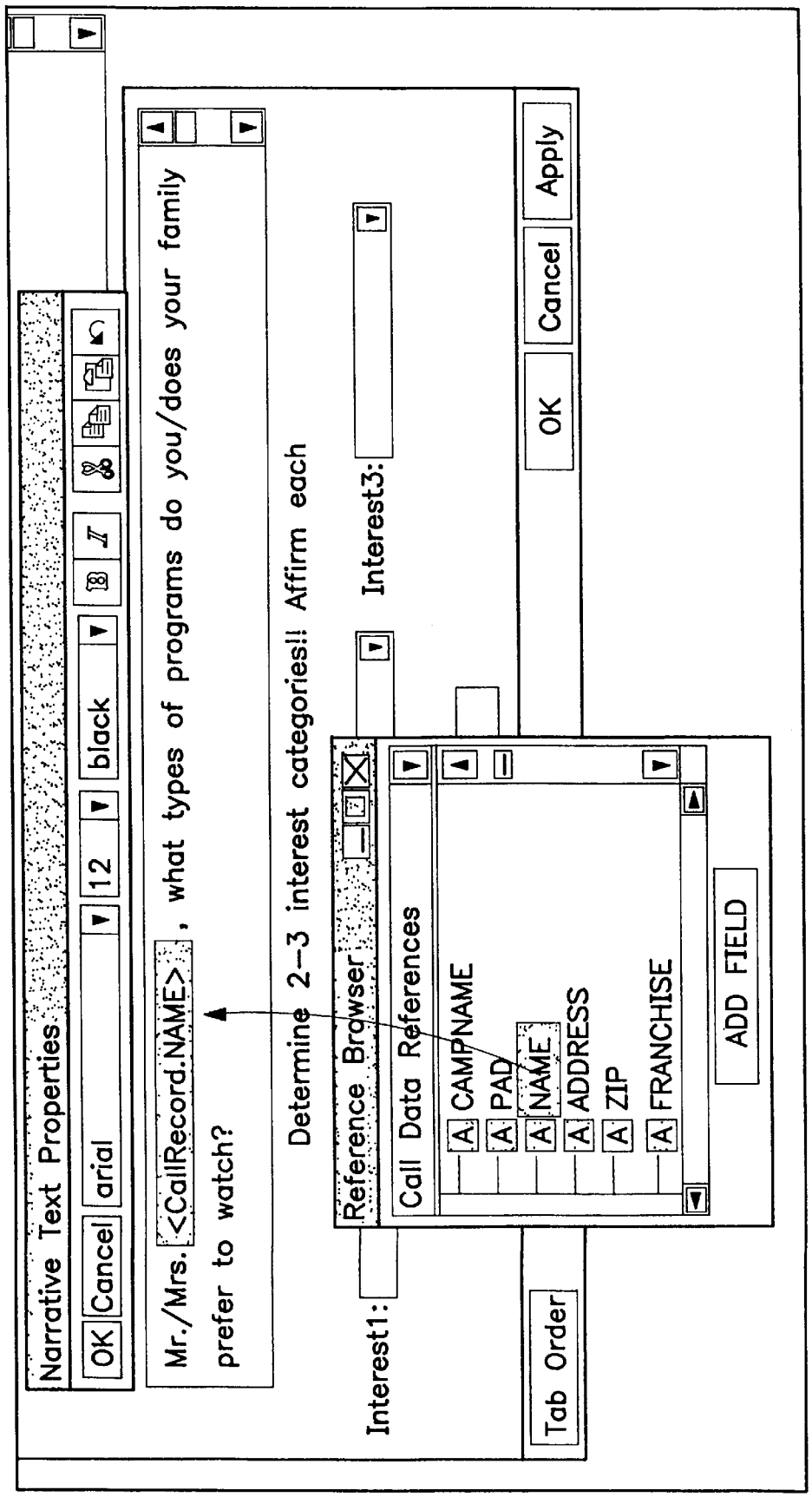
FIG. 5 shows a graphical screen view illustrating the use of call data elements in the application development tool of the invention.

The application developer specifies the call data display panel by placing selected call data elements and static text on the screen. FIG. 5 shows an example illustrating a "reference browser" window having previously defined call data elements therein. Items are selected from a list of available screen elements and "dropped" on the screen for placement. In the example shown in FIG. 5, a "NAME" element is dragged and dropped into a narrative text editor portion of the Application Development Tool. An adjustment "snap" grid is available to aid in aligning the screen elements. The font attributes of the display items may be changed to produce the desired panel display.

Figure 6:
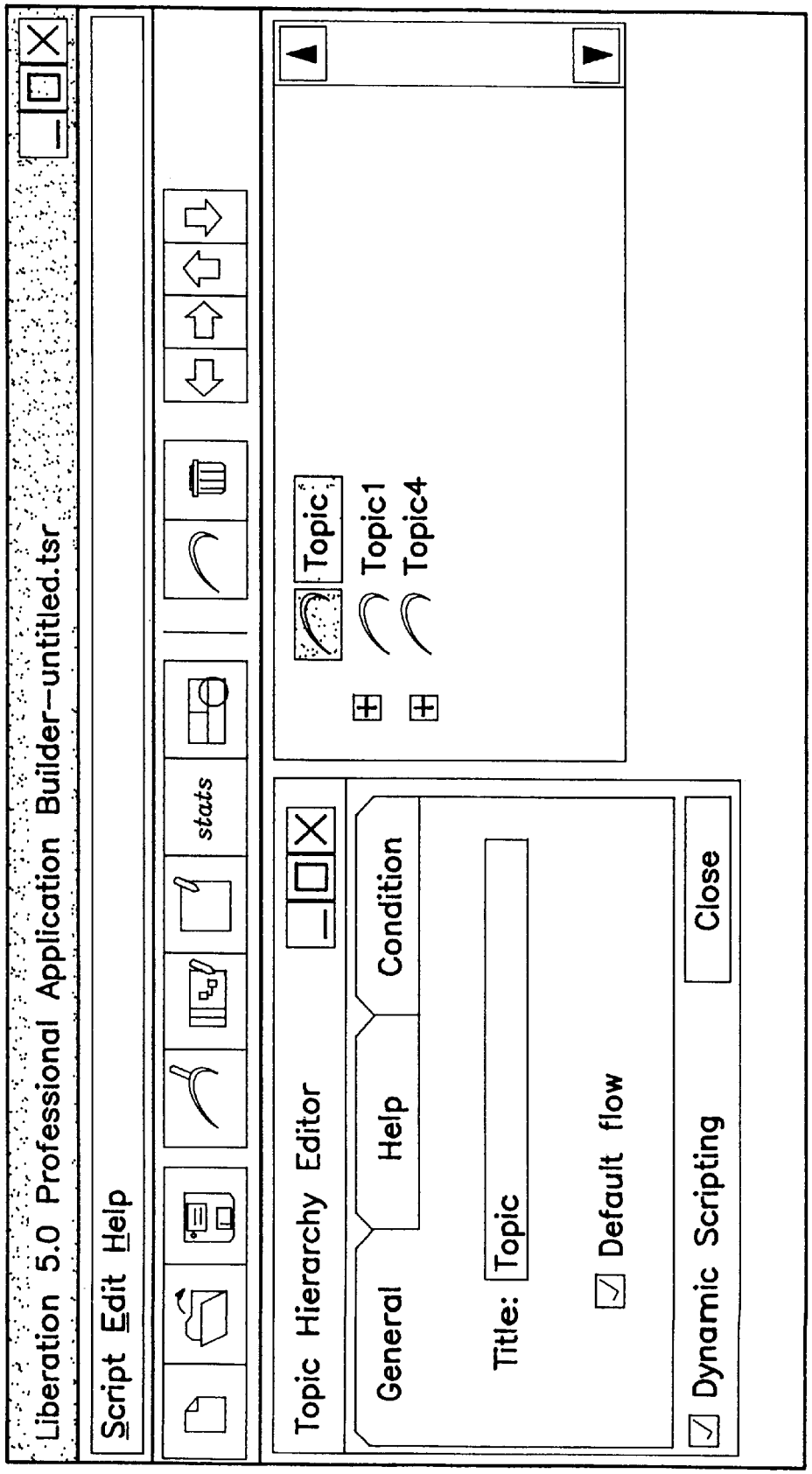
FIG. 6 shows a graphical screen view illustrating the creation and modification of call flow outline topics in the application development tool of the invention.

With reference to FIG. 6, the application development tool further allows the developer to input and modify the call flow outline. The application developer implements the call flow outline topics and hierarchy according to client application requirements. Outline topics may be added, deleted, or moved to any position in the outline sequence and hierarchy.

In the example of FIG. 6, a topic hierarchy editor is used to define a title, default flow indication, help information, and condition attributes associated with a topic in the call flow outline. The "default flow indication" indicates whether the topic should be included in the default flow of the script. The "condition" attribute is an expression indicating whether or not the topic can be selected by the agent.

Each topic in the outline is associated with an action panel and may optionally have a set of conditions for activation. Additionally, a topic may specify overriding the default display for outer outline topics. The display overrides will be in effect only when the topic containing the overrides is the current one.

Each topic may have a set of conditions that will determine if the topic is complete, and these conditions are based on call data elements. If the topic has been accessed and any of the completion conditions are not met, the topic is considered incomplete.

Figure 7:
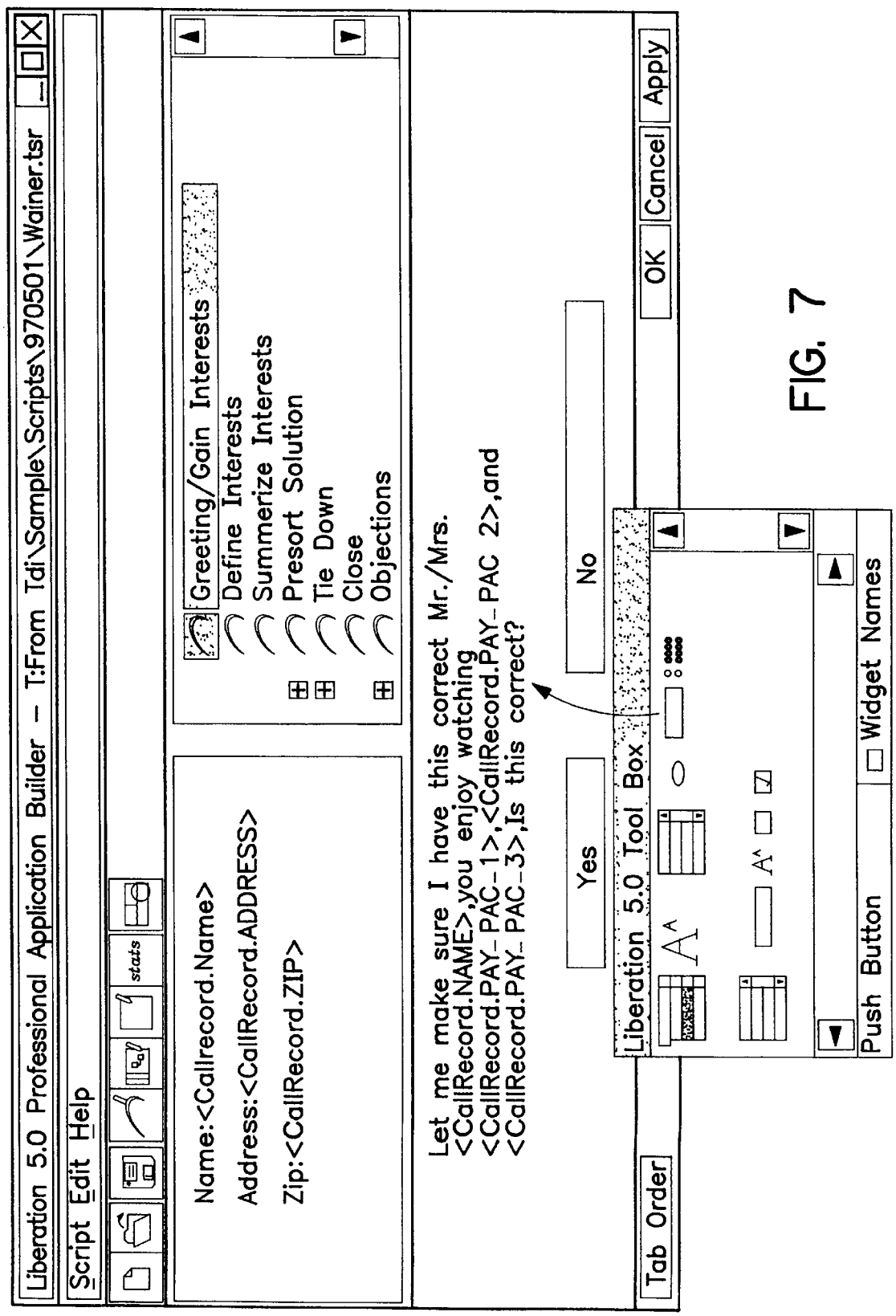
FIG. 7 shows a graphical screen view illustrating an Action Panel Editor function of the Application Development Tool of the invention.

The application development tool further provides for designing the agent interface action panels. FIG. 7 illustrates an Action Panel Editor function of the Application Development Tool which allows the application developer to create a new panel and assign a logical name. User interface items are selected from a list of available items and "dropped" on the panel for placement. Each item type has an appropriate set of configurations. The settings for each item placed on the action panel are accessed from a popup menu after selecting the item.

Available element types include display only text and call data, several types of entry fields, selection lists and "push buttons." In the example shown in FIG. 7, elements are graphically represented as widgets in a "tool box" window from which they are dragged onto the action panel editor portion of the screen. Each element type has a set of configurations which the developer defines by selecting an element and accessing a popup menu. The developer establishes the exit conditions for each panel by creating a logical test against call data.

Each panel may have a set of exit conditions which must be true before the user may exit the panel. These conditions are based on call data elements. Standard action panel items include:

1. Display only text
2. Display only call data or table lookup
3. Text entry field
4. Numeric entry field
5. Currency entry field
6. Zip/Postal code entry field
7. State/Providence entry field
8. Phone number entry field
9. Selection list
10. Multiple selection list
11. Definable "push button", "radio button set" and "check box"
12. Combination selection list and entry field.

Logic can be attached to any event. Such events include, e.g., topic entry; exit and continue (return from external script); Button and Radio Button click; Check Box and Entry Field changed; List Box selected and double clicked; Multiple Selection List Box multiple selection and double clicked; and Combo Box selected and changed.

Commands available within logic include done with topic, jump to topic (constant and variable), end script, call external script and initialize script variables. There are also commands for call control, database query/update and commands for host access. A command is included to enable/disable the Toolbar items.

The "done with topic" command causes the script to flow to the next topic in the default flow. Topics may be marked as not in the default flow and will then be skipped on a "done with topic".

Statements include variable assignment, if-then-else, statement loop and list manipulation. A full complement of operators and functions is provided.

In addition to the call record data there is a set of system and locally defined variables available for display, data entry and for use in the logic. The system variables have to do with operational data such as agent id, campaign name, and statistics like logged on time, number of calls and online time both total and for the current call. Some variables persist across calls, some do not.

The Application Development Tool preferably provides a means for the application developer to implement supplemental information by adding encyclopedia sections including the section contents, table of contents items, and keyword references. Cut and paste functions may be used if the information is in electronic form.

The invention can operate under a variety of call center computing environments. A typical environment for practice of the invention includes Microsoft Windows NT workstations, an IBM OS/2 Telephony Server and a Microsoft SQL Server, all connected via a Novell NetWare LAN. Source code illustrating the invention is attached hereto as a microfiche appendix which is incorporated herein by reference.

While the invention has been particularly shown and described with reference to a preferred embodiment thereof, it will be understood by those skilled in the art that various changes in form and details may be made therein without departing from the spirit and scope of the invention.

The embodiments of the invention in which an exclusive property or privilege is claimed are defined as follows:

1. A device for interactively providing a script to an agent during a calling campaign, comprising:
   outline panel means for displaying a call flow outline, said call flow outline comprising:
      first and second topics relating to said campaign;
      indicator means for initially displaying an indication that said first topic is currently selected;
   means for receiving navigational input from said agent;
   means for changing said indicator means in response to said navigational input, whereby said indicator means is changed to display an indication that said second topic is selected;
   data display panel means for initially displaying narrative text relating to said first topic; and,
   means for changing said data display panel means in response to said navigational is input, whereby said data display panel means is caused to display narrative text relating to said second topic.

2. The device according to claim 1, further comprising:
   means for receiving data input from said agent based upon said agent's interaction with a called/calling party during a call; and,
   means for using said data to update or create a call record.

3. The device according to claim 2, further comprising;
   means for enabling or disabling subsequent topics, during processing of said first topic, based at least in part upon said data input from said agent.

4. The device according to claim 2, further comprising;
   means for enabling or disabling subsequent topics, during processing of said first topic, based at least in part upon said data in said call record.

5. A device as claimed in claim 1, wherein the call is an outbound call.

6. A device as claimed in claim 1, wherein the call is an inbound call.

7. A device for interactively providing a script to an agent during a calling campaign, comprising:
   outline panel means for displaying a call flow outline, said call flow outline comprising:
      first, second, and third topics relating to said campaign;

indicator means for initially displaying an indication that said first topic is currently selected;

data display panel means for initially displaying narrative text relating to said first topic;

means for receiving a selection from said agent of either a first or second condition based upon said agent's interaction with a called/calling party;

means for changing said indicator means and for changing said data display means in response to receipt of a selection of said first condition, whereby said indicator means is changed to display an indication that said second topic is selected and said data display panel is changed to display narrative text relating to said second topic; and, means for changing said indicator means and for changing said data display panel means in response to receipt of a selection of said second condition, whereby said indicator means is changed to display an indication that said third topic is selected and said data display panel is changed to display narrative text relating to said third topic.

8. The device according to claim 1, wherein said means for receiving a selection from said agent comprises a graphical "YES" button and a graphical "NO" button.

9. A device as claimed in claim 7, wherein the call is an outbound call.

10. A device as claimed in claim 7, wherein the call is an inbound call.

11. A device for interactively providing a script to an agent during a calling campaign, comprising:

outline panel means for displaying a call flow outline, said call flow outline comprising:
first and second topics relating to said campaign;
indicator means for initially displaying an indication that said first topic is currently selected;

means for receiving navigational input from said agent;

means for changing said indicator means in response to said navigational input, whereby said indicator means is changed to display an indication that said second topic is selected;

action panel means for initially displaying a first set of objects relating to said first topic, said objects comprising one or more of a narrative text box, a push button, a single selection list box, a multi-selection list box, a radio button group, a combo box, a check box, a data entry field, and a label; and, means for changing said action panel means in response to said navigational input, whereby said action panel means is caused to display a second set of objects relating to said second topic, said second set of objects being different from said first set of objects.

12. The device according to claim 11, further comprising:

means for receiving data input from said agent based upon said agent's interaction with a called/calling party during a call; and, means for using said data to update or create a call record.

13. The device according to claim 12, further comprising;

means for enabling or disabling subsequent topics, during processing of said first topic, based at least in part upon said data in said call record.

14. The device according to claim 11, further comprising;

means for enabling or disabling subsequent topics, during processing of said first topic, based at least in part upon said data input from said agent.

15. A device as claimed in claim 11, wherein the call is an outbound call.

16. A device as claimed in claim 11, wherein the call is an inbound call.

17. A device for interactively providing a script to an agent during a calling campaign, comprising:

outline panel means for displaying a call flow outline, said call flow outline comprising:
first, second, and third topics relating to said campaign;
indicator means for initially displaying an indication that said first topic is currently selected;

data display means for initially displaying a set of widgets relating to said first topic;

means for receiving a selection from said agent of either a first or second condition based upon said agent's interaction with a called party;

means for changing said indicator means and for changing said action panel means in response to receipt of a selection of said first condition, whereby said indicator means is changed to display an indication that said second topic is selected and said action panel is changed to display a second set of widgets relating to said second topic; and, means for changing said indicator means and for changing said action panel means in response to receipt of a selection of said second condition, whereby said indicator means is changed to display an indication that said third topic is selected and said action panel means is changed to display a second set of widgets relating to said third topic.

18. A device as claimed in claim 17, wherein the call is an outbound call.

19. A device as claimed in claim 17, wherein the call is an inbound call.

* * * * *